(12) United States Patent
Nagar et al.

(10) Patent No.: US 11,455,416 B2
(45) Date of Patent: Sep. 27, 2022

(54) RECORD-LEVEL SENSITIVITY-BASED DATA STORAGE IN A HYBRID MULTI CLOUD ENVIRONMENT

(71) Applicant: Kyndryl, Inc., New York, NY (US)

(72) Inventors: Seema Nagar, Bangalore (IN); Kuntal Dey, New Delhi (IN); Sougata Mukherjea, New Delhi (IN); Pramod Vadayadiyil Raveendran, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 400 days.

(21) Appl. No.: 16/864,569

(22) Filed: May 1, 2020

(65) Prior Publication Data
US 2021/0342468 A1    Nov. 4, 2021

(51) Int. Cl.
| | | |
|---|---|---|
| *G06F 16/00* | (2019.01) | |
| *G06F 21/62* | (2013.01) | |
| *G06F 16/22* | (2019.01) | |
| *G06F 16/28* | (2019.01) | |
| *G06F 40/18* | (2020.01) | |
| *G06Q 50/26* | (2012.01) | |

(52) U.S. Cl.
CPC ........ *G06F 21/6227* (2013.01); *G06F 16/221* (2019.01); *G06F 16/2282* (2019.01); *G06F 16/285* (2019.01); *G06F 40/18* (2020.01); *G06Q 50/265* (2013.01)

(58) Field of Classification Search
CPC .. G06F 16/221; G06F 16/2282; G06F 16/285; G06F 21/6227; G06F 40/18; G06Q 50/265; G06Q 30/0255
See application file for complete search history.

(56) References Cited

U.S. PATENT DOCUMENTS

| | | | |
|---|---|---|---|
| 9,292,673 B2 | 3/2016 | Rutkowski et al. | |
| 9,460,307 B2 | 10/2016 | Breslau et al. | |
| 10,114,960 B1* | 10/2018 | McClintock | ........ H04L 63/1408 |
| 2004/0193870 A1* | 9/2004 | Redlich | ............... G06F 21/6245 |
| | | | 713/154 |
| 2010/0333116 A1 | 12/2010 | Prahlad et al. | |

(Continued)

OTHER PUBLICATIONS

Bhavani Thuraisingham, "Security Constraint Processing in a Multilevel Secure Distributed Database Management System," IEEE Transactions on Knowledge and Data Engineering, vol. 7, No. 2, Apr. 1995, pp. 274-293. (Year: 1995).*

(Continued)

*Primary Examiner* — Cheryl Lewis
(74) *Attorney, Agent, or Firm* — Ken Han; Hunter E. Webb; Keohane & D'Alessandro, PLLC

(57) ABSTRACT

An approach is provided for providing record-level sensitivity-based data storage in a networked computing environment. For each data record of a plurality of data records (e.g., rows) in a dataset, the record sensitivity is identified based on the data included in the data record, allowing different sensitivities to be identified for different records in the same dataset. A data center that has a data center sensitivity level that matches the record sensitivity is selected for the identified record sensitivity. Each data record is stored to a selected data center, with data records having different record sensitivities being stored in different data centers of different types, locations, etc.

20 Claims, 8 Drawing Sheets

(56) References Cited

U.S. PATENT DOCUMENTS

| | | | |
|---|---|---|---|
| 2012/0072992 A1* | 3/2012 | Arasaratnam | G06F 21/602 |
| | | | 726/26 |
| 2014/0181060 A1* | 6/2014 | Whitmyer, Jr. | G06F 16/24 |
| | | | 707/703 |
| 2015/0026760 A1* | 1/2015 | Lipman | G06F 21/6245 |
| | | | 726/1 |
| 2015/0074409 A1 | 3/2015 | Reid et al. | |
| 2015/0326601 A1* | 11/2015 | Grondin | G06F 21/577 |
| | | | 726/25 |
| 2016/0269418 A1 | 9/2016 | Sangary et al. | |
| 2017/0220818 A1* | 8/2017 | Nagasundaram | G06F 21/606 |
| 2017/0351871 A1* | 12/2017 | Christiansen | G06F 21/78 |
| 2021/0021603 A1* | 1/2021 | Gibbons | G06F 16/221 |
| 2021/0209251 A1* | 7/2021 | Parthasarathy | G06F 21/602 |
| 2021/0304341 A1* | 9/2021 | Green | G06F 16/285 |

OTHER PUBLICATIONS

"Greener Method for Sensitive Data Allocation Across Storage Cloud", ip.com, IPCOM000210319D, Aug. 30, 2011, 6 pgs.
"Managing data locations in a cloud", ip.com, IPCOM000227725D, May 13, 2013, 6 pgs.
Shang, Kehuan et al., "Sedic: Privacy-Aware Data Intensive Computing on Hybrid Clouds", CCS' 11, Oct. 17-21, 2011, pp. 515-525.

\* cited by examiner

| USER | COUNTRY | POSITION | HAS HEART DISEASE | YEARLY COMPENSATION | ... | AGE |
|---|---|---|---|---|---|---|
| A | OPQ | DEVELOPER | N | 50K | | 25 |
| B | XYZ | MAINTENANCE | Y | 30K | | 34 |
| C | JKL | CEO | N | 95K | | 65 |
| ... | | | | | | |
| N | FGH | TESTER | N | 40K | | 42 |

FIG. 6 ations of the invention, and therefore should not be considered as limiting the scope of the invention.

RECORD-LEVEL SENSITIVITY-BASED DATA STORAGE IN A HYBRID MULTI CLOUD ENVIRONMENT

TECHNICAL FIELD

The present invention relates generally to data storage. More specifically, aspects of the present invention provide solutions that provide hybrid storage for each individual record based on the individual record's sensitivity requirements in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

The large scale of resources provided by the network computing environment allows large amounts of data from many different sources to be stored across a large number of physical locations. One way that this large scale storage can be provided is by providing a hybrid multi-cloud environment. This hybrid multi-cloud environment may have data centers with data clusters at different countries/regions with different level data sensitivity and privacy related certifications. These data centers may include on-premise data centers owned by the enterprise, private clouds, hosted private clouds and multiple public clouds, which may have data centers at various locations spread around the world, among others.

SUMMARY

In general, aspects of the present invention provide an approach for providing record-level sensitivity-based data storage in a networked computing environment. For each data record of a plurality of data records (e.g., rows) in a dataset, the record sensitivity is identified based on the data included in the data record, allowing different sensitivities to be identified for different records in the same dataset. A data center that has a data center sensitivity level that matches the record sensitivity is selected for the identified record sensitivity. Each data record is stored to a selected data center, with data records having different record sensitivities being stored in different data centers of different types, locations, etc.

A first aspect of the invention provides a method for storing a dataset in a networked computing environment, comprising: identifying, for each data record of a plurality of data records in the dataset, a record sensitivity based on data included in the data record, wherein a first data record is identified as having a first sensitivity and a second data record is identified as having a second sensitivity; selecting, for each identified record sensitivity, a data center that has a data center sensitivity level that matches the record sensitivity; and storing each data record to a selected data center, wherein the first data record is stored to a first data center having a first data center type and the second data record is stored to a second data center having a second data center type.

A second aspect of the invention provides a system for storing a dataset in a networked computing environment, comprising: a memory medium comprising instructions; a bus coupled to the memory medium; and a processor coupled to the bus that when executing the instructions causes the system to perform a method, comprising: identifying, for each data record of a plurality of data records in the dataset, a record sensitivity based on data included in the data record, wherein a first data record is identified as having a first sensitivity and a second data record is identified as having a second sensitivity; selecting, for each identified record sensitivity, a data center that has a data center sensitivity level that matches the record sensitivity; and storing each data record to a selected data center, wherein the first data record is stored to a first data center having a first data center type and the second data record is stored to a second data center having a second data center type.

A third aspect of the invention provides a computer program product embodied in a computer readable storage medium that implements a method for storing a dataset in a networked computing environment, the method comprising: identifying, for each data record of a plurality of data records in the dataset, a record sensitivity based on data included in the data record, wherein a first data record is identified as having a first sensitivity and a second data record is identified as having a second sensitivity; selecting, for each identified record sensitivity, a data center that has a data center sensitivity level that matches the record sensitivity; and storing each data record to a selected data center, wherein the first data record is stored to a first data center having a first data center type and the second data record is stored to a second data center having a second data center type.

Still yet, any of the components of the present invention could be deployed, managed, serviced, etc., by a service provider who offers to store a dataset in a networked computing environment.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which:

FIG. 6 depicts an example dataset according to an embodiment of the present invention.

Figure 1:
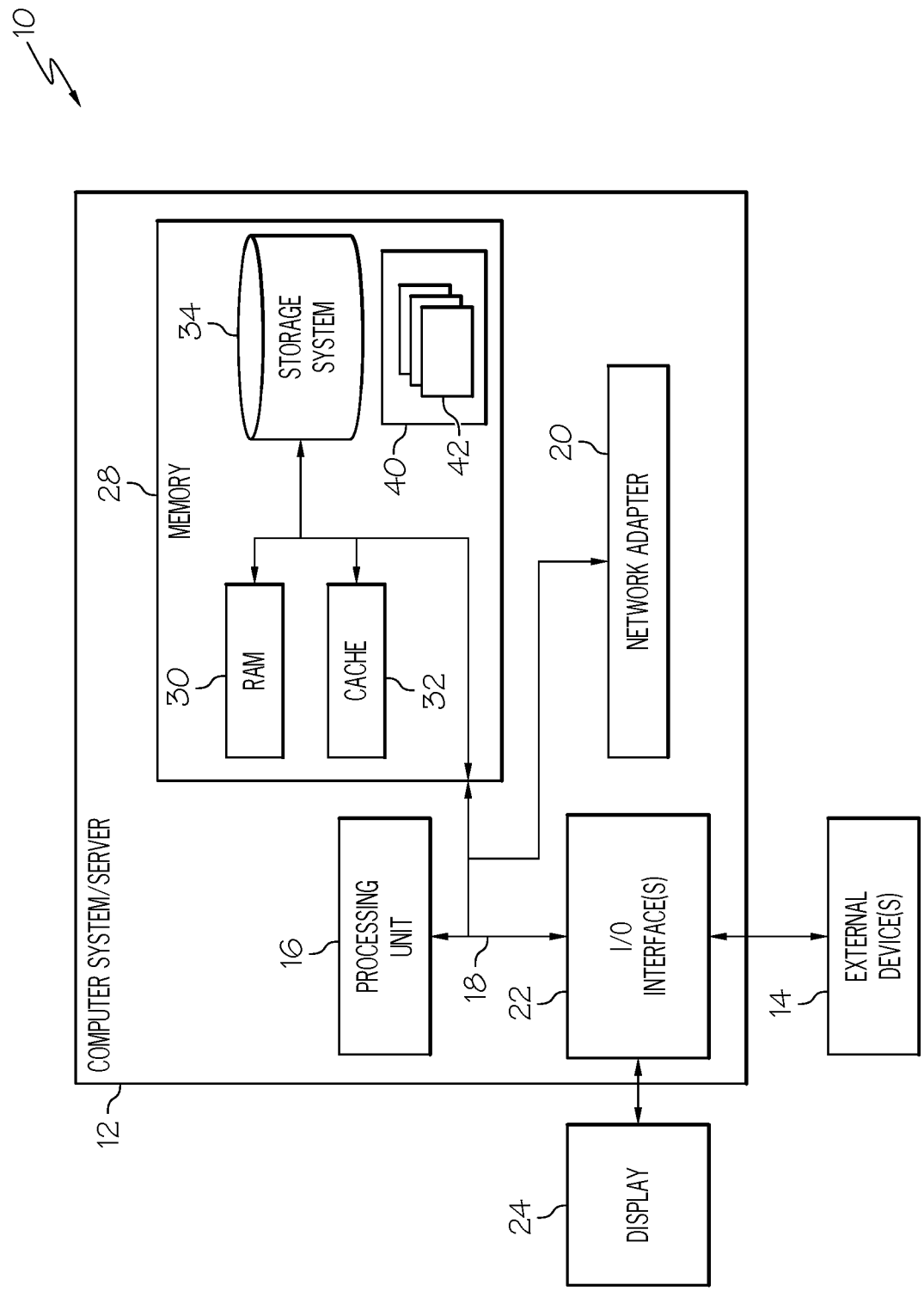
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the inven-

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for providing record-level sensitivity-based data storage in a networked computing environment. For each data record of a plurality of data records (e.g., rows) in a dataset, the record sensitivity is identified based on the data included in the data record, allowing different sensitivities to be identified for different records in the same dataset. A data center that has a data center sensitivity level that matches the record sensitivity is selected for the identified record sensitivity. Each data record is stored to a selected data center, with data records having different record sensitivities being stored in different data centers of different types, locations, etc.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
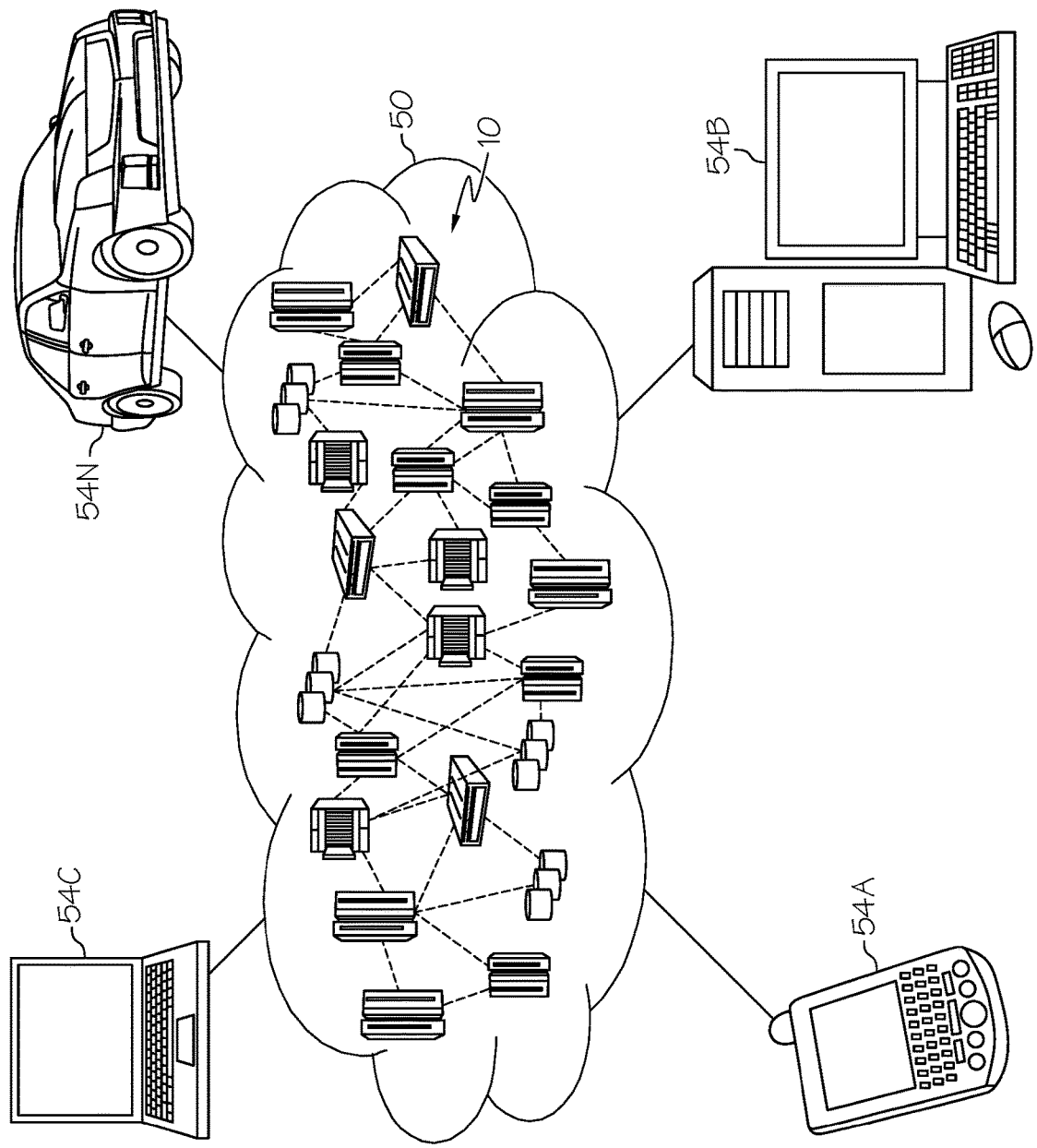
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
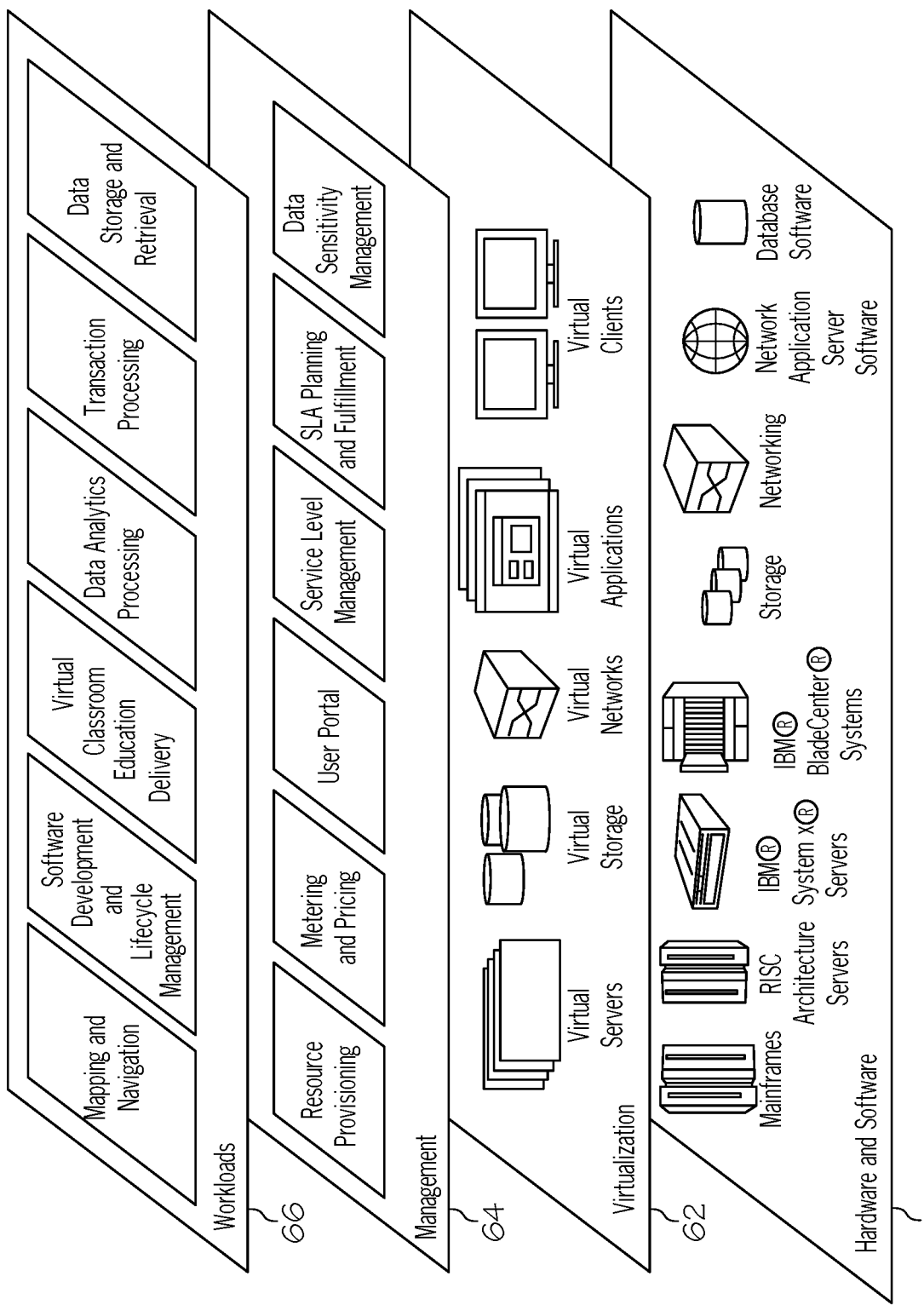
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is data sensitivity management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data storage and retrieval. As mentioned above, all of the foregoing examples described with respect to FIG. 3 are illustrative only, and the invention is not limited to these examples.

It is understood that all functions of the present invention as described herein typically may be performed by the communication facilitation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
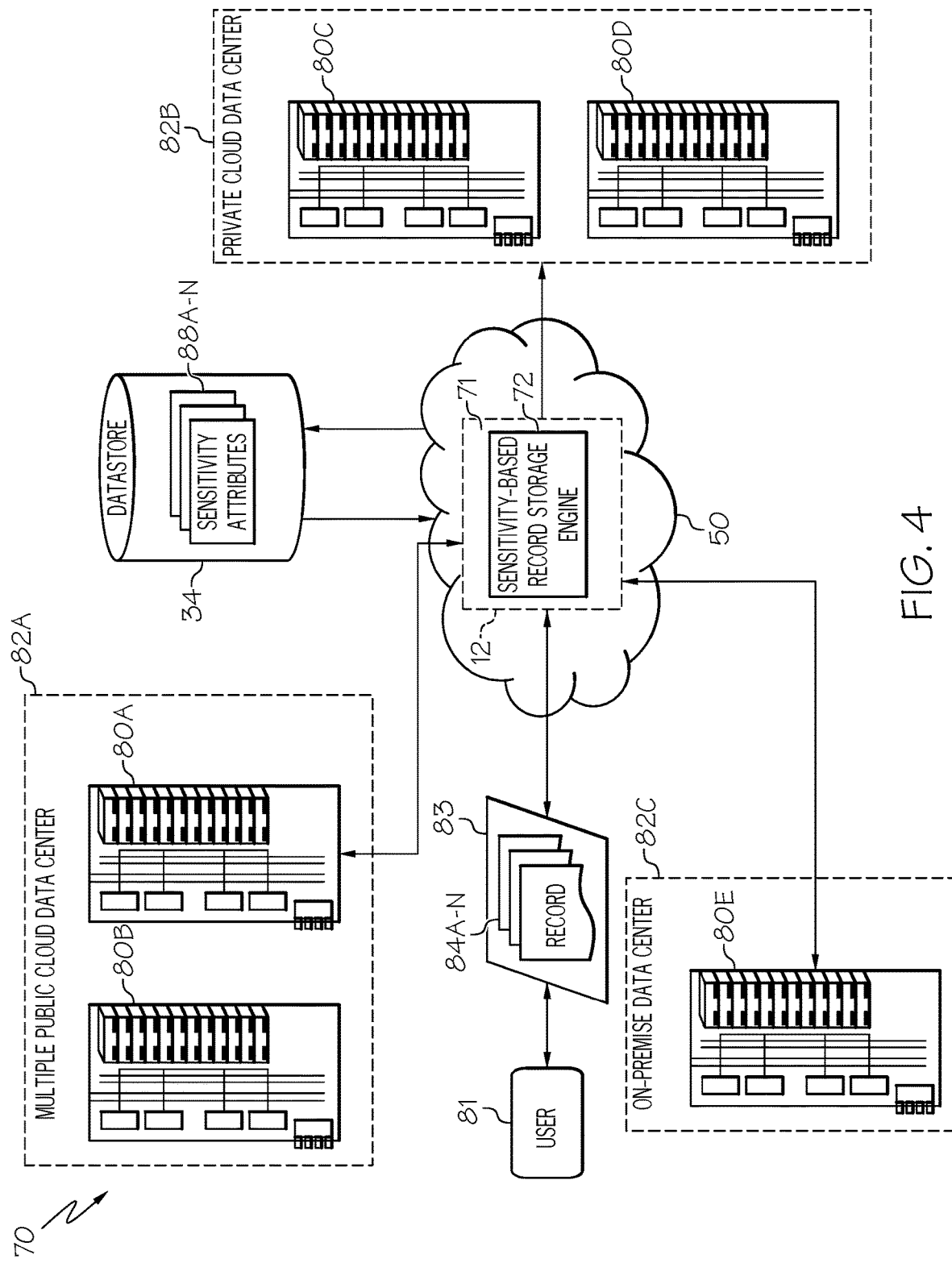
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment). In an embodiment, networked computing environment 70 is an enterprise computing environment. A stand-alone computer system/server 12 is shown in FIG. 4 for illustrative purposes only. In the event the teachings recited herein are practiced in a networked computing environment 70, each physical server 80N (hereinafter: generically singular 80N, generically plural 80A-N) need not have a sensitivity storage engine (hereinafter "system 72"). Rather, system 72 could be loaded on a server or server-capable device that communicates (e.g., wirelessly) with one or more physical servers 80A-N to provide record-level sensitivity-based data storage therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to data storage and retrieval in a networked computing environment. Such other system(s) have not been shown in FIG. 4 for brevity purposes.

Figure 5:
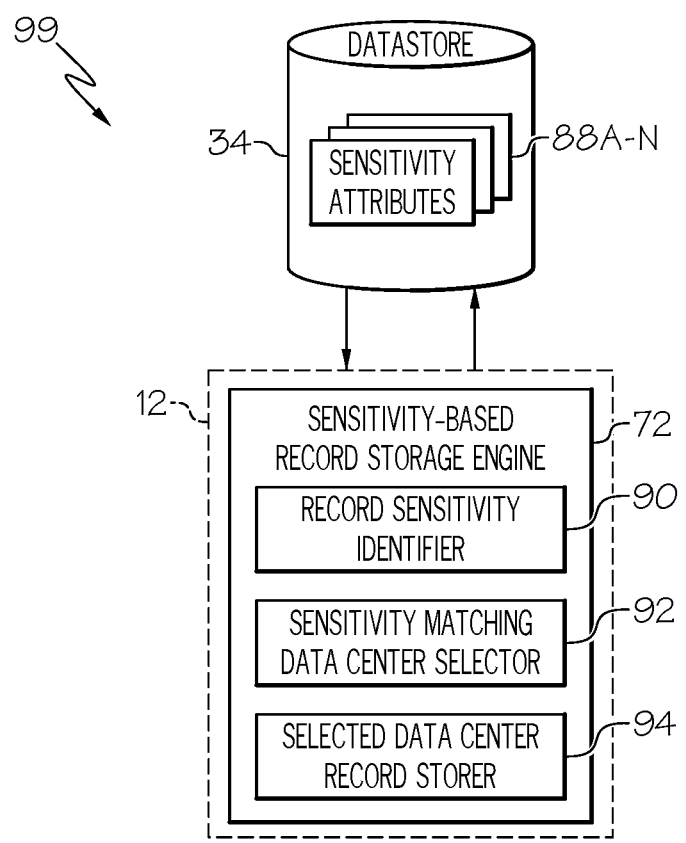
FIG. 5 depicts an example process components diagram according to an embodiment of the present invention.

Referring now additionally to FIG. 5, process components diagram 99 is depicted according to an embodiment of the present invention. System 72 may perform multiple functions similar to a general-purpose computer. Specifically, among other functions, system 72 can enable user 81 store one or more records 84A-N (hereinafter: generically singular 84N, generically plural 84A-N) of a dataset 85 onto servers 80A-N in sensitivity-matched servers data centers 82A-N (hereinafter: generically singular 82N, generically plural 82A-N) in a networked computing environment 70. To accomplish this, system 72 can include: a record sensitivity identifier 90, a sensitivity matching data center selector 92, and a selected data center record storer 94.

As shown, servers 80A-N in data centers 82A-N provide data storage for records 84A-N in a number of different datasets 83 being stored by a number of different users 81. To this extent, data centers 82A-N can provide storage using one of a number of different storage solutions. As shown, data center 82A is a multiple public cloud data center, data center 82B is a private cloud data center, and data center 82C is an on-premise data center. It should be understood that networked data centers of other types are envisioned as well, including, but not limited to, a hosted private cloud. In any case, certain data centers 82A-N are generally considered to be more secure than others. For example, because public access is generally more retracted, an on-premise data center 82C is generally considered to be more secure than a multiple public cloud data center 82A, which may have a large number of servers 80A-N spread over a large geographic area. Moreover, data centers 82A-N located in regions in which data privacy may not be as well protected, or which may require data transmission over a large distance, may be thought of as being less secure.

For these reasons, among others, some entities have begun to place restrictions on the types and locations of data centers 82A-N on which certain data can be stored. These restrictions aim to provide protection of sensitive data for legal or ethical reasons, for issues pertaining to personal privacy, and/or proprietary considerations, among others. For example, a particular nation may mandate a dataset 83 containing information about a person from that country must be on a data center 82A-N located within the country. In another example, a particular industry may have rules that specify that certain sensitive information must be stored in a data center 82A-N that has a particular level of security. Still further, a particular company may have rules that preclude information regarding company officers or proprietary data from being stored off-premises.

The inventors of the invention described herein have discovered certain deficiencies in the current solutions for facilitating data storage in the current network computing environment. Data records generated at enterprises often have large amounts of sensitive data that is specific to their compliance policies related to personal privacy, domain specific knowledge, other business specific confidential information, and/or the like. Also, there are country and industry specific regulations with respect to data placement. Also, these data records carry different value to different applications. Additionally, internet of things (IoT) sensors from organizations, individual homes, cars, industries, buildings etc., may also create large numbers of data records that contain sensitive data. However, most companies lack the infrastructure resources to store and process such large amounts of data locally. Because of this, many organizations are depending on hybrid multi-clouds to store and/or process/learn such large amounts of data records to get business specific insights. However, a hybrid multi-cloud data center environment may have data centers with data clusters at different countries/regions with different level data sensitivity and privacy related certifications. However, a particular dataset may have individual records 84A-N that have various levels of sensitivities, requiring different levels of compliance, with some data records being able to be stored only at on-premise data centers 82C, some being suitable for public clouds 82A, and the remainder being suitable for hosted private clouds 82B. These sensitivity values may also differ based on the application used to generate each data record.

Currently, the sensitivity of data is determined, at best, for the entire dataset 83. Because of this, every record 84A-N in the dataset 83 is stored in a data center 82A-N that meets the sensitivity requirements for the most sensitive record 84N in the dataset 83. As a result, more costly resources must often be procured to store large amounts of data in a dataset 83 based on the elevated sensitivity of a small number of records 84A-N. In addition, if a new record 84N that has an even greater sensitivity is added to the dataset 83, the entire dataset 83 must then be relocated to a new, more secure data center 82A-N. Moreover, it may be unclear how to handle datasets 83 that contain records 84A-N with conflicting sensitivities (e.g., a dataset 83 having records 84A-N for two individuals that are from different countries, where each country requires that the data be stored in data centers 82A-N located in the home country of the individuals).

Certain embodiments of the present invention may offer various technical computing advantages, including a more comprehensive solution for identifying data sensitivities and selecting data centers 82A-N that meet the legal, industrial, enterprise, and/or ethical requirements at the record (e.g., data row within a data table) level. This can allow less costly resources to be utilized for records 84A-N for which there are no sensitivity concerns, reducing the amount of more secure, and generally more costly, resources that must be procured to store records 84A-N having elevated sensitivities. Moreover, in cases in which a prior policy is currently in place to replicate the data records everywhere (all private and public cloud partners) in the cloud setup, the teachings included herein may result in the elimination of some clouds, or elements (e.g., data centers) within those clouds, based on the new record-level sensitivity identifications, saving money and resources. Further, each new record 84N can be evaluated to identify its unique sensitivity without impacting current storage locations of the remainder of the dataset 83. Still further, because different records 84A-N may be stored in different countries, as necessary, record sensitivity conflicts are eliminated.

Referring again to FIGS. 4-5, record sensitivity identifier 90 of system 72, as executed by computer system/server 12, is configured to identify the sensitivity (record sensitivity) for each data record 84N of a plurality of data records 84A-N in dataset 83. Record 84N is a basic data structure that has a collection of fields possibly of different data types. In an embodiment, each record 84A-N can be a single row of a database, or spreadsheet. Each record 84A-N in dataset 83 contains information about a user 81 who has opted in to sharing the information with data centers 82A-N. Dataset 83 can be a newly created dataset 83 whose records must be stored. Alternatively, dataset 83 can be a current dataset 83 for which new storage is being allocated. In each of these embodiments, record sensitivity identifier 90 can evaluate each record 84N of records 84A-N in dataset 83 as part of the storage operation for dataset 83. Alternatively, record 84N can be one of a set of new records 84A-N that is being added to a dataset 83 that has previously been stored according to the teachings of the invention, in which case record 84N can be evaluated individually, or each of the set of new records 84A-N can be evaluated in a batch.

Referring now to FIG. 6, an example dataset 100 is depicted according to an embodiment of the present invention. As shown, dataset 100 is in a table 402 format. To this extent, dataset 100 can be a spreadsheet, a sheet (page) within a spreadsheet, a table in a relational database, or the like. In any case, dataset 100 has a number of records 84A-N (FIG. 4), which are represented by rows 406A-N. Each row 406N has a number of fields that each contains data that is typically related to a specific entity, which, in table 402, is user 404A. These fields are arranged in table 402 into a number of columns 404A-N, such that fields in a particular column 404N contain data values of a particular type. For example, as shown, table 402 contains columns 404A-N pertaining to user 404A, country 404B, position 404C, has heart disease 404D, yearly compensation 404E, and age 404N.

In any case, referring now to FIGS. 4-6, to identify record sensitivities, record sensitivity identifier 90 can begin by identifying sensitive columns 404A-N in table 402 based on a set of sensitivity attributes 88A-N. For example, assume that company data policy and country wide law specifies that is not confidential health data of citizens is not supposed to be sent to a public cloud outside the boundaries of the country. In such as case, the record 84N corresponding to user B in row 406B who has a disease (has_heart_disease=yes) would be marked as sensitive and will not be stored on a public cloud. In contrast, all other rows 406A, 406C-N with 'has_heart_disease=No would be marked with a different sensitivity, indicating that they can be sent to data clusters in private and public clouds. In an embodiment, the one or more sensitivity attributes 88A-N used to determine each data sensitivity level can be input (e.g., using a graphical user interface) by user 81 for one or more field types (e.g., column 404A-N). Additionally or in the alternative, sensitivity attributes 88A-N can be obtained from outside sources. These outside sources may include, but are not limited to: a set of enterprise compliance policies, data policies of the company, and regulations with respect to country (where it resides and operates), industry and consumer guidelines, and/or the like. Based on these attributes 88A-N, the data sensitivity level for a particular column can be derived. In certain embodiments, additional applications-based sensitivity attributes 88A-N (e.g., application policies, databases, application documentation and catalogs) can be taken into account in performing this derivation. Further, other sensitivity related attributes such as privacy specific parameters, domain specific parameters, industry specific parameters, location specific parameters, and country specific parameters can also identified.

In any case, once sensitive columns 404A-N have been identified, record sensitivity identifier 90 can identify sensitive values within these columns. This identification can be made by comparing column values in each record 84A-N against sensitivity attributes 88A-N. For example, in the previously described example, value "Y" in has heart disease column 404D would be identified as having a sensitive value. In another example, suppose company policy specified that information about company officers had to be stored in on-premise data center 82C. In this case, value "CEO" in position column 404C of row 406C would be identified as having a sensitive value. Additionally or in the alternative, sensitive values can be based on a combination of values in multiple fields within a record 84N. For example, enterprise policy may dictate that information about technical workers (e.g., developers, testers, etc.) under age 40 that have yearly compensations over 45K sensitive. In this case, the row associated with user A 406A would be determined to be sensitive while the row associated with user N would not.

Once sensitive values have been identified within columns, the fields of each record generated are verified to find the sensitivity level. If all of the fields are sensitive based on the field type and/or value, the data record is marked as sensitive. In one of the embodiment sensitivity of a record can be computed in the following manner: Sensitivity=sum over all the columns (column sensitivity*value sensitivity). Based on this, the record can be classified based on its sensitivity. This classification can be binary or multi-valued depending on what different sensitivity levels are allowed by clouds of different types. For example, record 406C could be classified as having a first sensitivity level based on having a value of "CEO" in position column 404C, while record 406B could be classified as having a different second sensitivity level based on having a value of "Y" in has heart disease column 404D, and another record 406N could be classified as having a third sensitivity level that is different from both of the others based on having neither of these values.

Referring again to FIGS. 4-6, sensitivity matching data center selector 92 of system 72, as executed on computer system/server 12, is configured to select a data center 82N that has a data center sensitivity level that matches the identified record sensitivity identified by record sensitivity identifier 90 for each record in the dataset 83. To accomplish this, sensitivity matching data center selector 92 can identify data clusters that are available to the enterprise storing the dataset 83, which may be within their own multiple data centers, private clouds hosted at vendor DCs and multiple public cloud DCs located across the world. Based on this, sensitivity matching data center selector 92 can forms a list of data centers (and data clusters each data center carries) with attributes associated to the data that the data center can carry based on the sensitivity of the data. In an embodiment, this information can be derived from hybrid cloud management and brokerage tools, hybrid cloud data management tools and enterprise catalogs. The output from this process could include such information as: a list of data centers 82A-N and their locations, a list of data clusters and the data centers 82A-N that host them, a data sensitivity level of each cluster and data center 82A-N based on the sensitivity, security, privacy, industry and domain specific certifications the data center 82A-N has, the country in which the data center 82A-N locates, the country in which the enterprise operates and is under the jurisdiction of, and/or the like.

Further, sensitivity matching data center selector 92 can also create a whitelist having data sensitivity related attributes based on data sensitivity derived for each data record from previous methods and the countries. Each whitelist can include a list of countries in which the data record corresponding to the whitelist can be stored. This whitelist can be uploaded to a backend server along with the data record, where the backend server can identify a whitelisted country based on the whitelist. A data center 82N from the identified country can then be chosen based on the whitelist.

Selected data center record storer 94 of system 72, as executed on computer system/server 12, is configured to store each data record 84A-N to a selected data center 82N. Because this data center 82N has been selected based on sensitivities of each individual record 84A-N, different records 84A-N can be stored to different data centers 82A-N. Furthermore, because the sensitivities of each record 84N may define the type (e.g., on premise data center, a private cloud, a hosted private cloud, and a multiple public cloud, etc.) of data center 82N that each record 84N is allowed to be stored in, selected data center record storer 94 may store a first data record 84M to a first data center 82M having a first data center type and a second data record 84N to a second data center having a second data center type 82N. In an embodiment, data records 84A-N that have the same sensitivity, which are stored to the same data center 82N can be recombined into sub-tables for, and stored in conjunction with, each other on the data center 82N. Alternatively, each data record 84N in a common data center 82N can be stored and addressed separately within the data center 82N, using any known solution.

In any case, to accomplish the storing of each individual record, selected data center record storer 94 can create a token based on the whitelist uploaded by sensitivity matching data center selector 92. This token can be appended to the record 84N to be saved as part of the record's record header. Based on this taken, the data record 84N is then stored with the record header in the selected data center in the whitelisted country, as indicated by the token.

Figure 7:
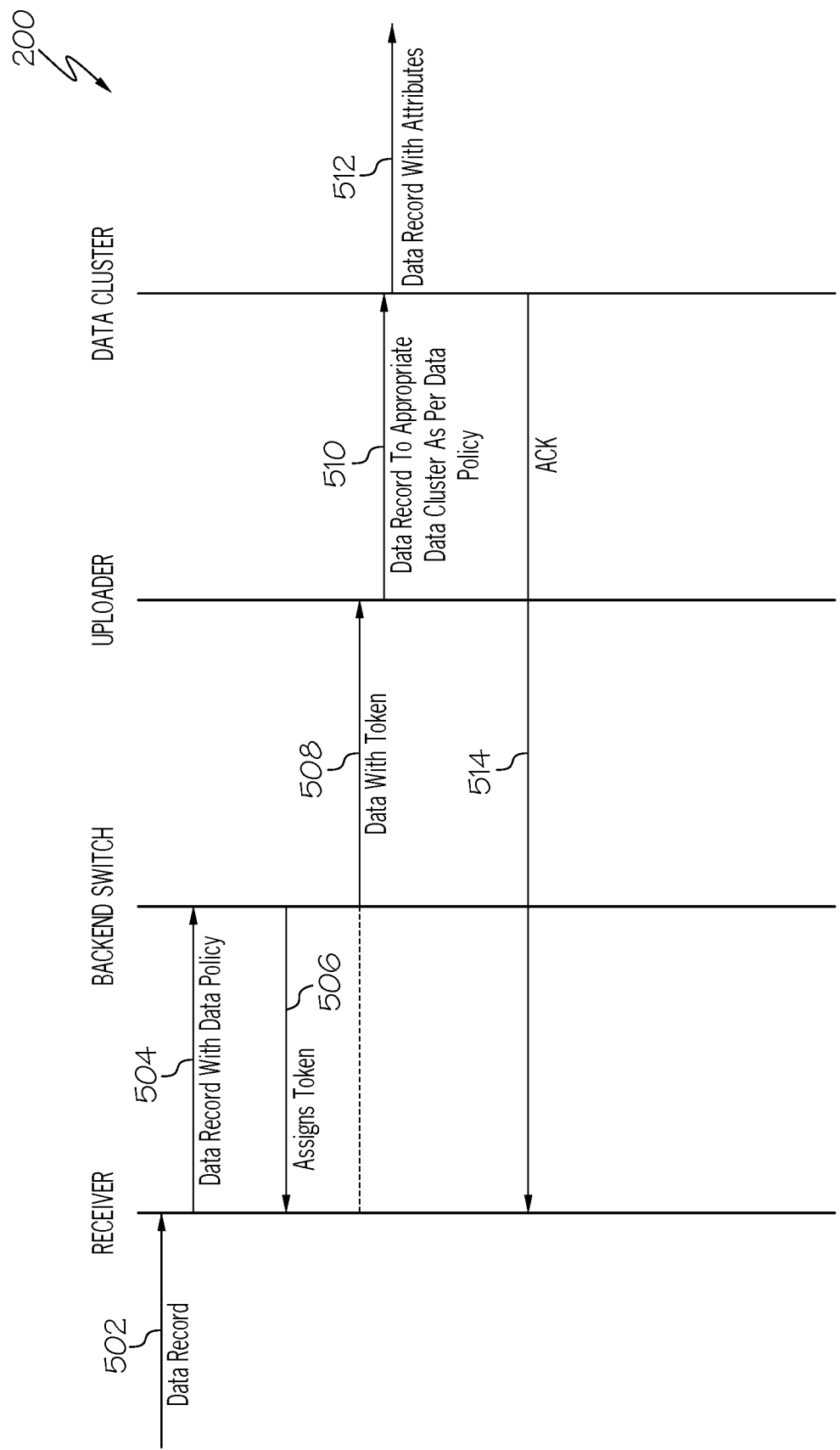
FIG. 7 depicts a flow diagram demonstrating storing of a record according to an embodiment of the invention.

Referring now to FIG. 7, a flow diagram 200 demonstrating storing of record 84N (FIG. 4) is shown according to an embodiment of the invention. Referring additionally to FIG. 4, as shown, data record 84N is newly received by a receiver in 502. In response, in 504, receiver forwards data record 84N with the data policy to a backend switch. In 506, the backend switch assigns a token and forwards the data record 84N and token to an uploader in 508. In 510, the uploader uploads data record 84N to the appropriate data cluster in selected data center 82N based on the data policy. In 512, the data cluster stores the data record 512 with its associated attributes and forwards an acknowledgement back to the receiver in 514.

Figure 8:
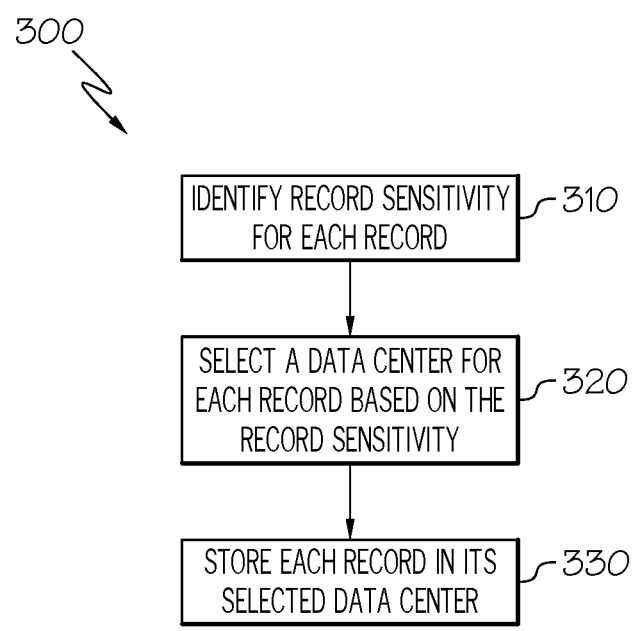
FIG. 8 depicts an example process flowchart according to an embodiment of the present invention.

Referring now to FIG. 8 in conjunction with FIGS. 4 and 5, a process flowchart 300 according to an embodiment of the present invention is shown. At 310, record sensitivity identifier 90 of system 72, as executed by computer system/server 12, identifies a record sensitivity for each data record 84N of a plurality of data records 84A-N in the dataset 83 based on data included in the data record. This results in a first data record that is identified as having a first sensitivity and a second data record that is identified as having a second sensitivity. At 320, sensitivity matching data center selector 92, as executed by computer system/server 12, selects a data center 82N that has a data center sensitivity level that matches the record sensitivity for each identified record sensitivity. At 330, selected data center record storer 94, as executed by computer system/server 12, stores each data record 84A-N to a selected data center 82A-N, such that the first data record is stored to a first data center having a first data center type and the second data record is stored to a second data center having a second data center type.

The process flowchart of FIG. 8 and block diagrams of the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While shown and described herein as an approach for storing a dataset in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for storing a dataset in a networked computing environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for storing a dataset in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices and disparate memory devices.

Furthermore, systems/units may also be implemented as a combination of software and one or more hardware devices. For instance, system 72 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for storing a dataset in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for storing a dataset in a networked computing environment, comprising:
   identifying, for each data record of a plurality of data records in the dataset, a record sensitivity based on data included in the data record, wherein a first data record is identified as having a first sensitivity and a second data record is identified as having a second sensitivity;
   selecting, for each identified record sensitivity, a data center that has a data center sensitivity level that matches the record sensitivity; and
   storing each data record to a selected data center, wherein the first data record is stored to a first data center having a first data center type and the second data record is stored to a second data center having a second data center type.

2. The method of claim 1, wherein the identifying of the record sensitivity further comprises:
   identifying any column in the data record that has a potential to contain a sensitive data value;
   defining which field values are sensitive data values for particular data fields in the data record;
   verifying each field in the data record to identify fields that have sensitive data values;
   aggregating values for identified fields to obtain an aggregate sensitivity value for the data record; and
   classifying the data record with a record sensitivity based on the aggregate sensitivity value.

3. The method of claim 2, wherein the classifying further comprises:
   identifying sensitivity related attributes for the data record based on a set of requirement parameters,
   wherein the set of requirement parameters include privacy specific parameters, domain specific parameters, industry specific parameters, location specific parameters, and country specific parameters.

4. The method of claim 1,
   wherein the dataset is selected from a group, comprising: a relational database table and a spreadsheet, and
   wherein each data record of the plurality of data records is a row in the dataset.

5. The method of claim 1, the selecting further comprising:
   creating a whitelist having data sensitivity related attributes based on data sensitivity derived for each data record from previous methods and countries, each whitelist including a list of countries in which a data record corresponding to the whitelist can be stored;
   uploading the whitelist along with the data record to a backend server;
   identifying, by the backend server, a whitelisted country based on the whitelist; and
   choosing, by the backend server, the data center within the country based on the whitelist.

6. The method of claim 5, the storing further comprising:
   creating a token based on the uploaded whitelist;
   appending the token to the data record as part of a record header; and
   storing the data record with the record header in the selected data center in the whitelisted country based on the token.

7. The method of claim 1,
   wherein the networked computing environment is a cloud computing environment,
   wherein at least one of the first data center and the second data center is a resource within the cloud computing environment, and
   wherein both of the first data center type and the second data center type are selected from a group, consisting of: an on premise data center, a private cloud, a hosted private cloud, and a multiple public cloud.

8. A system for storing a dataset in a networked computing environment, comprising:
   a memory medium comprising instructions;
   a bus coupled to the memory medium; and
   a processor coupled to the bus that when executing the instructions causes the system to perform a method, comprising:
      identifying, for each data record of a plurality of data records in the dataset, a record sensitivity based on data included in the data record, wherein a first data record is identified as having a first sensitivity and a second data record is identified as having a second sensitivity;
      selecting, for each identified record sensitivity, a data center that has a data center sensitivity level that matches the record sensitivity; and
      storing each data record to a selected data center, wherein the first data record is stored to a first data center having a first data center type and the second data record is stored to a second data center having a second data center type.

9. The system of claim 8, wherein the identifying of the record sensitivity further comprises:
   identifying any column in the data record that has a potential to contain a sensitive data value;
   defining which field values are sensitive data values for particular data fields in the data record;
   verifying each field in the data record to identify fields that have sensitive data values;
   aggregating values for identified fields to obtain an aggregate sensitivity value for the data record; and
   classifying the data record with a record sensitivity based on the aggregate sensitivity value.

10. The system of claim 9, wherein the classifying further comprises:
    identifying sensitivity related attributes for the data record based on a set of requirement parameters,
    wherein the set of requirement parameters include privacy specific parameters, domain specific parameters, industry specific parameters, location specific parameters, and country specific parameters.

11. The system of claim 8,
    wherein the dataset is selected from a group, comprising: a relational database table and a spreadsheet, and
    wherein each data record of the plurality of data records is a row in the dataset.

12. The system of claim 8, the selecting further comprising:
    creating a whitelist having data sensitivity related attributes based on data sensitivity derived for each data record from previous methods and countries, each whitelist including a list of countries in which a data record corresponding to the whitelist can be stored;
    uploading the whitelist along with the data record to a backend server;
    identifying, by the backend server, a whitelisted country based on the whitelist; and
    choosing, by the backend server, the data center within the country based on the whitelist.

13. The system of claim 12, the storing further comprising:
    creating a token based on the uploaded whitelist;

appending the token to the data record as part of a record header; and storing the data record with the record header in the selected data center in the whitelisted country based on the token.

14. The system of claim 8, wherein the networked computing environment is a cloud computing environment, wherein at least one of the first data center and the second data center is a resource within the cloud computing environment, and wherein both of the first data center type and the second data center type are selected from a group, consisting of: an on premise data center, a private cloud, a hosted private cloud, and a multiple public cloud.

15. A computer program product embodied in a computer readable storage medium that implements a method for storing a dataset in a networked computing environment, the method comprising:

identifying, for each data record of a plurality of data records in the dataset, a record sensitivity based on data included in the data record, wherein a first data record is identified as having a first sensitivity and a second data record is identified as having a second sensitivity;

selecting, for each identified record sensitivity, a data center that has a data center sensitivity level that matches the record sensitivity; and storing each data record to a selected data center, wherein the first data record is stored to a first data center having a first data center type and the second data record is stored to a second data center having a second data center type.

16. The computer program product of claim 15, wherein the identifying of the record sensitivity further comprises:

identifying any column in the data record that has a potential to contain a sensitive data value;

defining which field values are sensitive data values for particular data fields in the data record;

verifying each field in the data record to identify fields that have sensitive data values;

aggregating values for identified fields to obtain an aggregate sensitivity value for the data record; and classifying the data record with a record sensitivity based on the aggregate sensitivity value.

17. The computer program product of claim 16, wherein the classifying further comprises:

identifying sensitivity related attributes for the data record based on a set of requirement parameters, wherein the set of requirement parameters include privacy specific parameters, domain specific parameters, industry specific parameters, location specific parameters, and country specific parameters.

18. The computer program product of claim 15, the selecting further comprising:

creating a whitelist having data sensitivity related attributes based on data sensitivity derived for each data record from previous methods and countries, each whitelist including a list of countries in which a data record corresponding to the whitelist can be stored;

uploading the whitelist along with the data record to a backend server; and identifying, by the backend server, a whitelisted country based on the whitelist.

choosing, by the backend server, the data center within the country based on the whitelist.

19. The computer program product of claim 18, the storing further comprising:

creating a token based on the uploaded whitelist;

appending the token to the data record as part of a record header; and storing the data record with the record header in the selected data center in the whitelisted country based on the token.

20. The computer program product of claim 15, wherein the networked computing environment is a cloud computing environment and wherein at least one of the first data center and the second data center is a resource within the cloud computing environment, and wherein both of the first data center type and the second data center type are selected from a group, consisting of: an on premise data center, a private cloud, a hosted private cloud, and a multiple public cloud.

\* \* \* \* \*